(12) United States Patent
L'Her et al.

(10) Patent No.: US 10,094,940 B2
(45) Date of Patent: Oct. 9, 2018

(54) METHOD FOR LOCALIZING A MARINE MAMMAL IN AN UNDERWATER ENVIRONMENT IMPLEMENTED BY A PAM SYSTEM, CORRESPONDING DEVICE, COMPUTER PROGRAM PRODUCT AND NON-TRANSITORY COMPUTER-READABLE CARRIER MEDIUM

(71) Applicant: SERCEL, Carquefou (FR)

(72) Inventors: Christophe L'Her, Loperhet (FR); Simon Vallez, Brest (FR); Veronique L'Her Marrec, Nantes (FR)

(73) Assignee: SERCEL, Carquefou (FR)

( * ) Notice: Subject to any disclaimer, the term of this patent is extended or adjusted under 35 U.S.C. 154(b) by 0 days.

(21) Appl. No.: 15/483,463

(22) Filed: Apr. 10, 2017

(65) Prior Publication Data
US 2017/0212255 A1    Jul. 27, 2017

Related U.S. Application Data

(63) Continuation of application No. 14/296,009, filed on Jun. 4, 2014, now Pat. No. 9,625,592.
(Continued)

(51) Int. Cl.
*G01V 1/00* (2006.01)

(52) U.S. Cl.
CPC ...... *G01V 1/001* (2013.01); *G01V 2210/1293* (2013.01); *G01V 2210/1423* (2013.01)

(58) Field of Classification Search
CPC .. G01V 1/00; G01V 1/001; G01V 2210/1293; G01V 2210/1423
See application file for complete search history.

(56) References Cited

U.S. PATENT DOCUMENTS

| 4,509,151 A | 4/1985 | Anderson |
| 4,635,236 A * | 1/1987 | Roberts ............... G01V 1/3835 367/130 |

(Continued)

OTHER PUBLICATIONS

Nosal_ Sperm whale three-dimensional track swim orientation beam pattern and click levels observed on bottom-mounted hydrophones_2007 (Year: 2007).*

(Continued)

*Primary Examiner* — Isam A Alsomiri
*Assistant Examiner* — Amie M Ndure
(74) *Attorney, Agent, or Firm* — Ipsilon USA, LLP (57) ABSTRACT

A method for localizing a marine animal in an underwater environment implemented by a passive acoustic monitoring (PAM) system. The passive acoustic monitoring system includes network of acoustic sensors adapted to carry out measurements of acoustic signals. The method includes: obtaining, from the network of acoustic sensors, measured data of an acoustic signal emitted by a marine animal; defining a space of dimensional representation of the underwater environment discretized in a plurality of predefined cells, for each cell of a predefined set, obtaining an error defined as a value of a cost function for the cell, the cost function giving a deviation between: at least some of the measured data; and corresponding theoretical data obtained by assuming the marine animal is located in the cell, the errors obtained for the predefined set of cells enabling to obtain at least one piece of information about localization of the marine animal.

19 Claims, 4 Drawing Sheets

Related U.S. Application Data (60) Provisional application No. 61/951,877, filed on Mar. 12, 2014.

(56) References Cited

U.S. PATENT DOCUMENTS

| | | | |
|---|---|---|---|
| 6,845,062 B2* | 1/2005 | Niezrecki | H04B 13/02 |
| | | | 367/131 |
| 7,269,096 B2 | 9/2007 | Millikin | |
| 7,974,151 B2 | 7/2011 | Iranpour et al. | |
| 9,557,428 B2* | 1/2017 | L'Her | G01V 1/001 |
| 9,625,592 B2* | 4/2017 | L'Her | G01V 1/001 |
| 2003/0004652 A1* | 1/2003 | Brunner | A01K 1/031 |
| | | | 702/19 |
| 2003/0028327 A1* | 2/2003 | Brunner | A01K 1/031 |
| | | | 702/19 |
| 2003/0083822 A2* | 5/2003 | Brunner | A01K 1/031 |
| | | | 702/19 |
| 2003/0100998 A2* | 5/2003 | Brunner | A01K 1/031 |
| 2005/0278158 A1 | 12/2005 | Ellison et al. | |
| 2007/0025182 A1* | 2/2007 | Robertsson | G01V 1/38 |
| | | | 367/18 |
| 2008/0144442 A1* | 6/2008 | Combee | G01V 1/22 |
| | | | 367/131 |
| 2009/0141587 A1* | 6/2009 | Welker | G01V 1/3817 |
| | | | 367/16 |
| 2009/0251991 A1* | 10/2009 | Ayela | G01V 1/201 |
| | | | 367/20 |
| 2010/0106743 A1* | 4/2010 | Brunner | A01K 1/031 |
| | | | 707/780 |
| 2010/0278010 A1 | 11/2010 | Gubin et al. | |
| 2010/0290316 A1 | 11/2010 | Caudal et al. | |
| 2012/0120760 A1 | 5/2012 | Groenaas et al. | |
| 2014/0293749 A1 | 10/2014 | Gervaise | |

OTHER PUBLICATIONS

European Search Report and Written Opinion dated Sep. 15, 2015 for corresponding European Application No. 15156406, filed Feb. 24, 2015.

Baggenstoss, "Processing advances for localization of beaked whales using time difference of arrival", The Journal of the Acoustical Society of America, Jun. 1, 2013 (Jun. 1, 2013), pp. 4065-4076, XP055213157.

* cited by examiner

| $J(\theta_1)$ | $J(\theta_3)$ |
|---|---|
| $J(\theta_2)$ | $J(\theta_4)$ |

METHOD FOR LOCALIZING A MARINE MAMMAL IN AN UNDERWATER ENVIRONMENT IMPLEMENTED BY A PAM SYSTEM, CORRESPONDING DEVICE, COMPUTER PROGRAM PRODUCT AND NON-TRANSITORY COMPUTER-READABLE CARRIER MEDIUM

1. CROSS REFERENCE TO RELATED APPLICATION

The present application is based on and claims the benefit of U.S. Provisional Patent Application Ser. No. 61/951,877, filed Mar. 12, 2014, the content of which is hereby incorporated by reference in its entirety.

2. FIELD OF THE INVENTION

The field of the invention is that of passive acoustic monitoring. It deals with the equipments required in order to respect constraints imposed by regulating agencies which aim to protect marine mammal life.

More specifically, the invention pertains to a technique for localizing a marine animal implemented by a passive acoustic monitoring system, also called PAM system.

The invention can be applied notably, but not exclusively, for localizing marine mammals including cetaceans, such as mysticetes and odontocetes.

The invention relates to marine seismic survey, but can be of interest for any other field which requires a system performing marine mammals' monitoring in a marine environment.

3. TECHNOLOGICAL BACKGROUND

It is sought more particularly here below in this document to describe problems existing in the field of geophysical data acquisition for analysing the sea-bed (e.g. for oil exploration industry using seismic method). The invention of course is not limited to this particular field of application but is of interest for any technique for localizing a marine animal in a marine environment that has to cope with closely related or similar issues and problems.

Regulation agencies, such as JNCC ("Joint Nature Conservation Committee"), MMS ("Minerals Management Service"), IBAMA ("Brazilian Institute of Environment and Renewable Natural Resources"), DFO ("Department of Fisheries and Oceans"), which have as objective the protection of marine mammals, encourage or impose the use of a PAM system during seismic survey campaigns.

These regulating agencies propose guidelines defining rules to apply during seismic campaigns in order to protect the marine mammals. In particular the guidelines recommend the PAM system to detect the presence of marine mammals in the vicinity of seismic sources comprised in the PAM system, which sources can be considered as injurious to the marine mammal life (e.g. acoustic disturbances). A safety exclusion zone is generally defined by the regulation agencies around the seismic sources (e.g. the JNCC agency defines a regulated exclusion zone of 500 meters) to exclude the presence of the marine mammals or limit time of exposure to acoustic waves produced by the seismic sources.

In the prior art, a PAM system typically comprises a network of acoustic sensors, such as hydrophones or geophones or accelerometers or vector sensors, arranged along one or several linear acoustic antennas (hereafter referred to "streamers") and adapted for detecting and measuring vocalizes, i.e. acoustic signals emitted by marine mammals. When a marine mammal vocalizes in the vicinity of the network of seismic sensors, these sensors make measurements of the acoustic signal or signals emitted by the marine mammal. A localization computation is then performed from the measurement data collected by the sensors to determine the localization of the marine mammal from the seismic sources.

There are two known families of PAM systems used by the oil prospecting companies:
- the integrated PAM systems, which rely on the use of a network of existing seismic sensors distributed on the streamers towed by the seismic vessel, which seismic sensors being originally adapted to perform geophysics data acquisition,
- the independent PAM systems, which rely on the use of a network of dedicated seismic sensors arranged along a linear acoustic line, which is deployed in addition to the existing streamers behind the seismic vessel and entirely dedicated to the passive acoustic monitoring (hereafter referred to "dedicated PAM line").

The prior art PAM systems inform the operators of the marine mammal positions over the survey, which positions are generally split into a range and a bearing referred to the seismic vessel. The positions are then compared to the safety exclusion zone and when a marine mammal is detected inside the safety exclusion zone, then constraints on the seismic survey operations are imposed, such as the shutdown of the seismic sources or the change of some seismic source characteristics (e.g. amplitude or frequency acoustic signals emitted by the seismic sources).

Despite the fact that the errors of the locations can be significant compared to the dimensions of the safety exclusion zone, the prior art PAM systems currently allow carrying out a localization computation, but do not give any uncertainty on the mammal position, to the operator. As a consequence, the final decision taken by the operator (for example to turn off the seismic sources) is taken without knowing the real risk of presence of the marine mammal inside or outside the safety exclusion zone.

Figure 1:
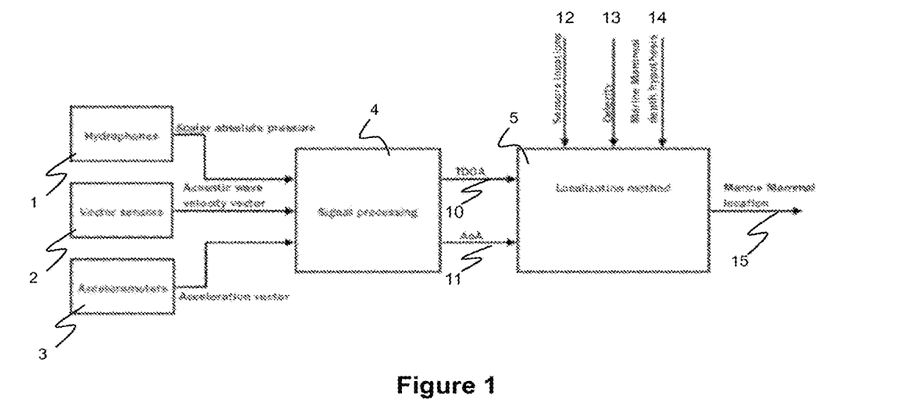
FIG. 1, already described with reference to the prior art, presents in a block diagram a classic configuration of a PAM system implementing a known method for localizing a marine mammal.

FIG. 1 illustrates, in a functional block diagram, a simplified example of a classic configuration of a PAM system implementing a known method for localizing a marine mammal.

On detection of vocalizations, the seismic sensors 1 (hydrophones), 2 (vector sensors), 3 (accelerometers) of the PAM system carry out acoustic signal measurements (scalar absolute pressure for the hydrophones 1, non-scalar acoustic sound velocity for the vector sensors 2, non-scalar sensor acceleration for the accelerometer 3), which are then collected by a signal processing unit 4. After processing, the unit signal processing unit 4 generates time difference of arrival (TDOA) data 10 and angle-of-arrival (AoA) data 11 to a computation unit 5, which is adapted to provide a value of marine mammal localization 15 by applying a known localization method, such as least-square or beamforming or triangulation or a cross-bearing. Data of position of the seismic sensors (arrow 12) and data of underwater acoustic sound celerity (arrow 13) are also provided to the computation unit 5. The latter can also take into account a hypothesis on the depth at which the marine mammal is estimated to be (arrow 14).

Thus, to summarize, whatever the known localization method used by the PAM system, the marine mammal localization by a PAM system requires processing the following set of measured data:
  data derived from the acoustic sensors measurements:

time difference of arrival (TDOA) data;
angle-of-arrival (AoA) data;
data of position of the seismic sensors (which can be measured data or predefined data),
data of underwater acoustic sound celerity (which can be measured data or predefined data).

TDOA data can be computed thanks to measurements of time-of-arrival (TOA) of a marine mammal vocalization or measurements of difference of phase between two seismic sensors receiving a vocalization of a marine mammal. A measurement of angle of arrival of the marine mammal vocalization can be carried out either between two seismic sensors (e.g. between two synchronized hydrophones) or on distinct seismic sensors (e.g. an acoustic vector sensor or an accelerometer).

Theses known localization methods may also need to do some assumptions, namely:
an assumption on the marine mammal depth can be made if the PAM system does not allow to get enough data to completely solve the localization problem,
an assumption on the underwater acoustic sound celerity assuming that acoustic waves are propagating in straight line.

However all measured data used by the known localization methods are generally affected by errors. It therefore leads to an uncertainty on the marine mammal localization:
Sensor position data, TDOA data, AoA data, and acoustic sound celerity data are generally affected by errors, thereby introducing a significant error in the localization computation. Moreover, wrong hypothesis made on the sound celerity and/or the marine mammal depth and/or on the position of seismic sensors, also contribute in increasing the uncertainty of localization of the marine mammal.
The seismic sensors positioning is an issue for a network of seismic sensors towed on streamers or a dedicated PAM line, as the movement of the seismic vessel towing the sensor networks as well as the hydrodynamic instabilities at the sensors induce feather on the network of sensors. Moreover, the towed sensor network often lacks the possibility to measure in real time the real position of the sensors in space. Then, the sensor locations used by the localization method are very rough estimates and generally distort the localization performances of the marine mammal.
The accuracies of TDOA and AoA data have also a significant impact on the localization uncertainty. The TDOA and AoA data are computed by signal processing methods which are applied on measurement signals acquired by the different seismic sensors. The accuracies of TDOA and AoA data depend on:
the marine mammal species (vocalization emission level, vocalization beam pattern, vocalization frequency bandwidth, vocalization duration),
the environment (ambient noise level, reflected paths, acoustic sound celerity profile, etc.),
the processing applied to the measurement signals (sampling frequency, processing gain, etc.).
An error on the celerity measurements also introduces an error on the marine mammal localization computation. Some sound velocimeters are generally integrated to the streamers but only measure the celerity at the streamers depth, whereas the celerity at the marine mammal depth can be significantly different, in particular, in presence of thermocline effects.
One skilled in the art could easily compute this errors using algorithms such as the best standard deviation computation in order to provide an uncertainty area. However, predefining errors is complex and as the environment is constantly changing, predefined errors could be adapted for a short period of time but not the following.

4. SUMMARY OF THE INVENTION

A particular embodiment of the invention proposes a method for localizing a marine animal in an underwater environment implemented by a passive acoustic monitoring (PAM) system, the first passive acoustic monitoring system comprising a network of acoustic sensors adapted to carry out measurements of acoustic signals, The localizing method is such that it comprises steps of:
obtaining, from the network of acoustic sensors, a first set of measured data of an acoustic signal emitted by a marine animal;
defining a space of dimensional representation of the underwater environment discretized in a plurality of predefined cells,
for each cell of a predefined set of cells among said plurality, obtaining an error defined as a value of a cost function for said cell, said cost function giving a deviation between:
at least some of said measured data of the first set and corresponding theoretical data obtained by assuming that the marine animal is located in said cell,
said errors obtained for the predefined set of cells enabling to obtain at least one piece of information about localization of the marine animal.

This particular embodiment relies on a wholly novel and inventive approach. Indeed, instead of making directly a computation of localization as in the prior art, the general principle of the invention consists in discretizing a space of representation of the underwater environment into cells and determining, for each one, the deviation (i.e. the "distance" in a mathematic sense) between the data actually measured by the seismic sensors and corresponding theoretical data by assuming that the marine animal is located in that cell. Thus, the space of representation is obtained with a certain number of values each representative of a level of error, from which it is possible to have information about localization of the marine animal. The cell (or cells) for which the error (errors) is (are) the smallest means that the marine mammal has a good probability of being present in it (them).

According to a particular feature, the method comprises a step of establishing an error map from said errors obtained for the predefined set of cells.

Thus, from the error map, the information about localization of the marine animal can be either provided by the method itself or determined intellectually by the operator himself. Indeed, the error map enables to provide a visual presentation of the errors, from which it possible to identify the zones of space in which the errors are the smallest (in other words, the zones of space in which the probability of presence of the marine animal is the greatest).

According to a particular feature, the method comprises a step of computing, from said error map, a probability distribution function of presence of the marine animal.

It permits to provide a meaningful representation in space from which information on the probability of presence of the marine animal can be obtained in an easy way.

According to a particular feature, the method comprises a step of determining a value of localization of the marine animal as a function of the probability distribution function.

Indeed, the value of localization can be defined as the maximum or the barycentre of the probability distribution function.

According to a particularly advantageous feature, the method comprises a step of determining a zone of uncertainty of localization of the marine animal as a function of the probability distribution function.

Indeed, by thresholding the probability distribution function with a predetermined threshold, which is representative of a desired probability level of presence of the marine animal, such as 95% for example, the method according to the invention provides a zone of uncertainty of localization in which the marine animal has a probability of presence of 95%. Thus, contrary to the prior art method according to which only a localization computation is carry out, the method according to the invention enables the operator to have not only a much more accurate localization of the marine animal but also a piece of information on the uncertainty of localization.

According to a particular feature, the method comprises a step of comparing the zone of uncertainty of localization with a predefined safety exclusion zone.

According to a particular feature, the method comprises a step of providing a piece of information on probability of presence of the marine animal inside the predefined safety exclusion zone, as a function of the result of the comparing step.

This additional piece of information is very important in practice because it conditions the shutdown of the seismic source in case of positive result.

The level of confidence in the decision-making process is increased thanks to the invention as the uncertainties on the measured data are taken into account by the PAM system.

According to a particular feature, the method comprises a step of providing a piece of information on probability of presence of the marine animal outside the predefined safety exclusion zone, as a function of the result of the comparing step.

If there is a high probability of presence of the marine animal outside the predefined safety exclusion zone, the operator can consider that the marine mammal is far enough from the seismic sources of the PAM system and that the seismic survey operations remains, for example, unchanged.

More particularly, according to an advantageous feature, the method comprises steps of:
  detecting an intersection zone of the zone of uncertainty of localization and the predefined safety exclusion zone,
  providing a piece of information on probability of presence of the marine animal inside said intersection zone.

According to a particular feature, the measured data belong to the group comprising:
  time difference of arrival data;
  angle of arrival data;
  data relative to location of the acoustic sensors;
  data relative to underwater acoustic sound celerity.

According to a particularly advantageous feature, the method further comprises a step of obtaining at least one second set of measured data of said acoustic signal emitted by the marine animal, collected from a network of acoustic sensors of at least one second passive acoustic monitoring system cooperating with said first passive acoustic monitoring system, said defining step and step of obtaining an error are carried out as a function of said first and second sets of measured data.

In that way a greater number of measured data of the acoustic signal emitted by the marine animal are taken into account in the localizing process, thereby making information about localization even more accurate.

Thus the method advantageously applies to a multi-PAM system.

In another embodiment, the invention pertains to a computer program product comprising program code instructions for implementing the above-mentioned method (in any of its different embodiments) when said program is executed on a computer or a processor.

In another embodiment, the invention pertains to a non-transitory computer-readable carrier medium, storing a program which, when executed by a computer or a processor causes the computer or the processor to carry out the above-mentioned method (in any of its different embodiments). In other word, the non-transitory computer-readable carrier medium stores the above-mentioned computer program product.

In another embodiment, the invention pertains to a device for localizing a marine animal in an underwater environment implemented by a passive acoustic monitoring (PAM) system, the passive acoustic monitoring system comprising a network of acoustic sensors adapted to carry out measurements of acoustic signals. The localizing is such that it comprises:
  means for obtaining, from the network of acoustic sensors, measured data of an acoustic signal emitted by a marine animal;
  means for defining a space of dimensional representation of the underwater environment discretized in a plurality of predefined cells,
  means for obtaining an error defined as a value of a cost function for a cell, activated for each cell of a predefined set of cells among said plurality, said cost function giving a deviation between:
    at least some of said measured data and
    corresponding theoretical data obtained by assuming that the marine animal is located in said cell,
  means for obtaining at least one piece of information about localization of the marine animal taking into account said errors obtained for the predefined set of cells.

Advantageously, the device comprises means for implementing the steps it performs in the process of localization as described above, in any of its various embodiments.

Advantageously, the passive acoustic monitoring system cooperates with either the navigation software unit or the positioning streamer software unit.

For example, the passive acoustic monitoring system is comprised in the navigation software unit so as to display the information about localization of the marine animal on the navigation display screen.

5. LIST OF FIGURES

Other features and advantages of embodiments of the invention shall appear from the following description, given by way of an indicative and non-exhaustive examples and from the appended drawings, of which.

6. DETAILED DESCRIPTION

In all of the figures of the present document, identical elements and steps are designated by the same numerical reference sign.

In the example described below, we consider the localization of a marine mammal in the context of a sea oil survey.

Figure 2:
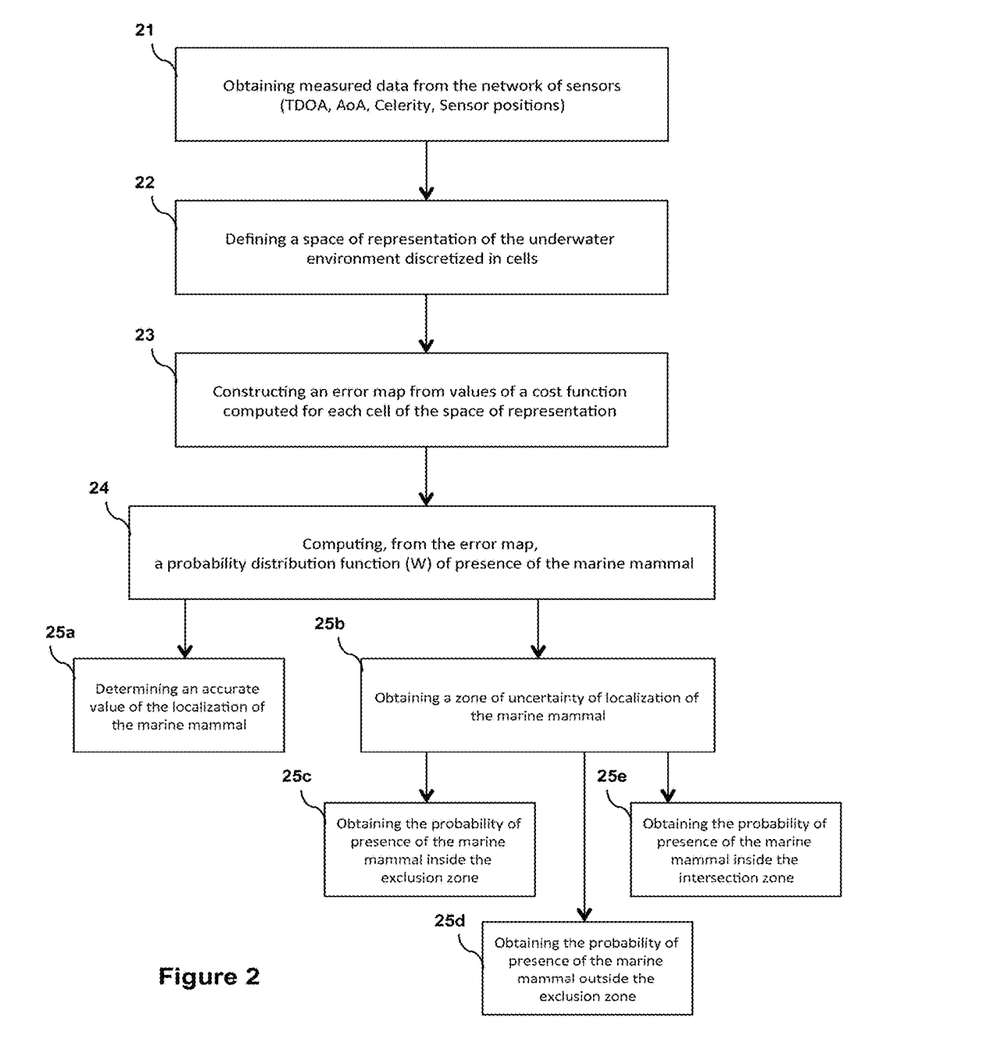
FIG. 2 provides a schematic illustration of a flowchart of a particular embodiment of the method according to the invention.

Referring now to FIG. 2, we present a localizing method according to a particular embodiment of the invention. This method is carried out by a device (the principle of which is described in detail below in relation with FIG. 6).

Figure 3:
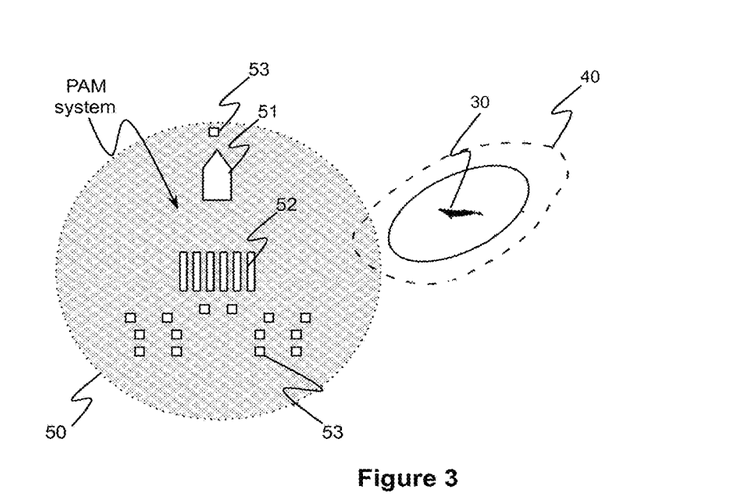
FIG. 3 represents a schematic illustration of the principle of functioning of the method according to the embodiment described in FIG. 2.

As illustrated on FIG. 3, we consider a PAM system comprising a plurality of acoustic sources 52 and a network of acoustic sensors 53 adapted to carry out measurements of acoustic signals. The acoustic sensors (represented by white boxes) are arranged along several streamers (acoustic linear antennas) towed by a seismic vessel 200. These acoustic sensors could be positioned in the survey equipment as well such as on the airguns array, head or tail buoy . . . . The acoustic sensors 53 are of the following type: hydrophones and/or accelerometers and/or vector sensors (couple of geophones).

In the present example we consider that some sensors of the network of acoustic sensors 53 are sensors originally adapted to perform geophysics data acquisition, for instance hydrophones whose the primary function is to receive acoustic signals generated by at least one of the sources 52 and reflected by the subsurface's layers, for geophysics data acquisition purposes.

The localizing method is initialized upon detection by the network of acoustic sensors 53 of a vocalization (i.e. an acoustic signal) emitted by a marine mammal 30 in the vicinity of the network. The different acoustic sensors carry out measurements of the vocalization as described above in relation with prior art. A set of measured data of the following type is then obtained:

time difference of arrival (TDOA), which are derived from the acoustic sensors measurements;

angle-of-arrival (AoA), which are derived from the acoustic sensors measurements;

the positions $(x_i, y_i)$ of the seismic sensors, which can be measured data or predefined data, data underwater acoustic sound celerity (C), which can be a measured data or a predefined data.

In the particular embodiment discussed below, the inputs of the localizing method are thus TDOA, AoA, positions $(x_i, y_i)$, data on the acoustic sound celerity (C). The outputs of the localizing method are localizing information to take a decision about seismic survey operations.

For the purposes of simplifying the description, the localizing method is described below in a context of two-dimensional (2D) computation. Of course, the localizing method can also be implemented in a context of three-dimensional (3D) computation without departing from the scope of the invention.

In step 21, the device obtains a set of measured data from the network of sensors 54. Then for the obtained set of measured data, the device executes step 22.

In step 22, the device defines a space of 2D representation of the underwater environment in which the PAM system operates, this space being discretized so as to form a grid of square cells with predefined dimensions (for example cells of 20 sq. m. (square meters) each). Once the defined grid of cells, the device executes step 23.

In step 23, the device performed, for each cell of the grid, an error computation which results from the application of a cost function for said cell, the cost function being as a function of the deviation (or the distance in a mathematic sense) between the data actually measured by the seismic sensors and corresponding theoretical data by assuming that the marine animal is located in this cell.

We consider a lower operating mode in which only one set of measured data is obtained in step 21, namely:

$\widetilde{TDO}\,A_k$, which is a TDOA value estimated from a couple k of acoustic sensors;

$\widetilde{Ao}\,A_l$, which is a AoA value estimated from an acoustic sensor l or a couple l of acoustic sensors;

$\tilde{P}_m$, which is the position (x,y) estimated for the acoustic sensor m;

$\tilde{C}_n$, which is the underwater acoustic sound celerity estimated at point n.

The number of set of data discussed here is deliberately limited purely for the purposes of pedagogical description, and so as not to burden the description. Of course, in order to obtain more accurate localization information, a greater number of sets of measured data is necessary. For example, 100 sets of measured data would give high accurate localization information about the marine animal localization for applications such as those mentioned here above.

We consider that the cost function is of the type used usually in an error minimization method, for example a least-square method. The cost function, noted $J(\theta_i)$, is defined the summation of the square deviation between the measured data and corresponding theoretical data obtained by assuming that the marine animal is located in the cell for which the cost function is computed.

In a particular embodiment, the cost function $J(\theta_i)$ is defined as:

$$J(\theta_i)=\Sigma_{i=1}^{N}(\widetilde{TDO}\,A_k-\text{TDOA}(\theta_i))^2+(\widetilde{Ao}\,A_l-\text{AoA}(\theta_i))^2+(\tilde{P}_m-P(\theta_i))^2+(\tilde{C}_n-C(\theta_i))^2$$

with:

$\theta_i$, the estimation of the position of the marine mammal 30 in the cell of index i.

$\widetilde{TDO}\,A_k$, the TDOA value estimated from the couple k of acoustic sensors;

$\text{TDOA}(\theta_i)$, the theoretical TDOA value obtained by assuming that the marine animal is located in the cell $\theta_i$;

$\widetilde{Ao}\,A_l$, the AoA value estimated from the acoustic sensor l or the couple l of acoustic sensors;

$\text{AoA}(\theta_i)$, the theoretical AoA value obtained by assuming that the marine animal is located in the cell $\theta_i$;

$\tilde{P}_m$, the position (x,y) estimated for the acoustic sensor m;

$P(\theta_i)$, the theoretical position obtained for the acoustic sensor m by assuming that the marine animal is located in the cell $\theta_i$;

$\tilde{C}_n$, the underwater acoustic sound celerity estimated at point n.

$C(\theta_i)$, the theoretical underwater acoustic sound celerity obtained at point n by assuming that the marine animal is located in the cell $\theta_i$.

It should be noted that this cost function $J(\theta_i)$ is an example of embodiment among others possible embodiment. Any function that illustrate a deviation between at least some measured data and corresponding theoretical data obtained by assuming that the marine animal is located in the cell for which the cost function is computed, can be envisaged without departing from the scope of the invention.

Figure 5:
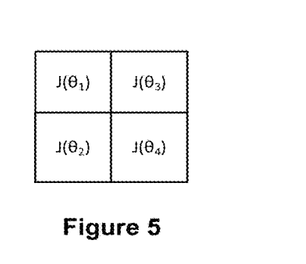
FIG. 5 represents an example of portion of discretized space of representation used in the embodiment illustrated in FIG. 2.

A simplified example of a grid of four cells is illustrated in FIG. 5. Thus, when step 23 is executed, a value of the cost function $J(\theta_i)$, also called error or residue, is computed for each of the four cells 1 to 4:

$J(\theta_1)$ for the cell of index 1,
$J(\theta_2)$ for the cell of index 2,
$J(\theta_3)$ for the cell of index 3,
$J(\theta_4)$ for the cell of index 4.

The value thus obtained for each of the cells represents an error level obtained for a given region of space of representation of the underwater environment. Thus, the error level obtained is lower, the probability of presence of the marine mammal 30 in the considered cell is higher.

This reasoning is applied for all cells comprised in the space of representation defined in step 21 (exhaustive computation).

Then, the device converts, by means of a known grayscale conversion, each value obtained into a corresponding grey level so as to establish an error map for the all cells of the space of representation. This enables the operator to have a visual presentation of the errors from which it will be able to obtain any useful information about the localization of the marine mammal 30.

For example, the greyscale conversion is applied so that the lowest values (i.e. the errors of lowest level) are allocated to the dark color and the highest values (i.e. the errors of highest level) are allocated to the white color.

Figure 4A:
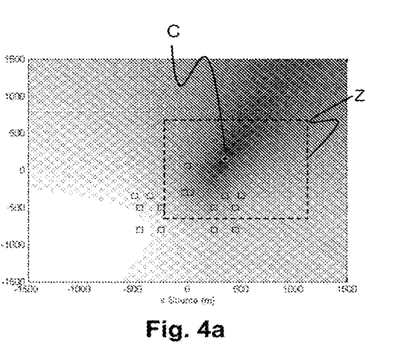
FIGS. 4a and 4b illustrate an example of error map obtained according to a particular embodiment of the invention.
Figure 4B:
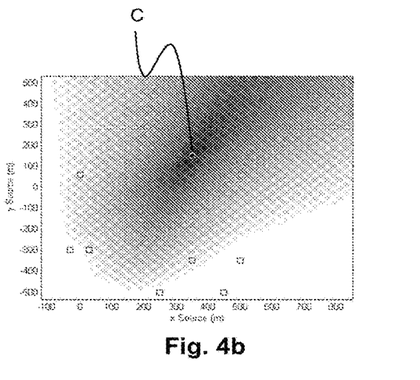

An example of error map is illustrated in FIGS. 4a, 4b. FIG. 4a represents an error map established for the network of acoustic sensors (represented by white boxes) according to the sensor configuration illustrated in FIG. 3 and FIG. 4b represents a zoom Z of FIG. 4a. The white circle C corresponds to the cell for which the error is the smallest, that is to say for which the probability of presence of the marine mammal 30 is the greatest.

It should be noted that the particular embodiment described here is based on an exhaustive computation (determination of an error for all cells of the space of representation defined in step 21). It could be however envisaged an alternative embodiment in which a non-exhaustive computation, such as a local computation, can be carried out, for example by selecting a predefined set of cells of the grid so as to save computing time. To do so, the skilled person in the art will consider stochastic, heuristics or metaheuristics computation such as the Gauss-Newton method for instance. For those, the computation process of function $J(\theta_i)$ evolves from one cell to another until a predefined criterion is reached, such as a number of iterations or a specific gradient evolution value.

Then, once the established error map, the device executes step 24.

Figure 7:
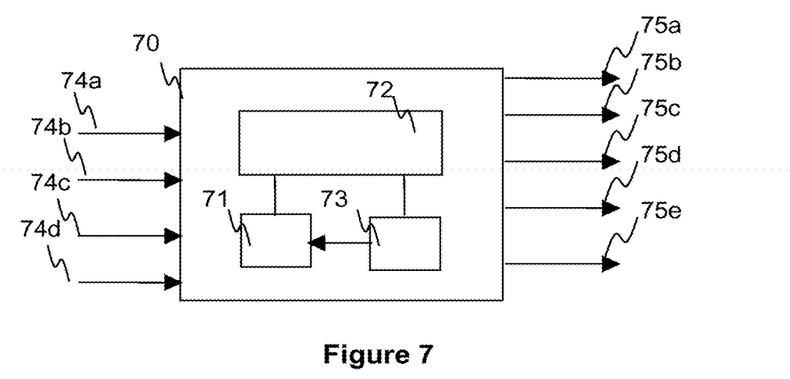
FIG. 7 shows the simplified structure of a localizing device according to a particular embodiment of the invention.

In step 24, the device computes a probability distribution function (W) of presence of the marine animal from the error map established in step 23. A perspective representation of this probability distribution function (W) is illustrated in FIG. 7.

To achieve this, the device applies processes allowing to present an information that is easily understandable and manageable by the operator. In a first phase, a function of offset substation is applied to the error map so that an offset is deleted on whole previously computed errors. The offset can be defined in different ways. Nonexhaustively, it can be defined:

as the computed maximum error value determined in the error map;

as a representative value of the low gradient zone, the latter gradient zone being defined as the area in which computed error values do not vary much in adjacent cells;

as a polynomial function representative of the low gradient zone.

In a second phase, an inversion function is applied so as to make the computed values positive, for a better understanding (transition from errors into probabilities). In a third phase, a normalization function is applied so that the computed values are normalized to a predefined value range, such as [0,100] for instance, with the objective of homogenizing and fitting the errors values across the area to a specific range. Then, in a fourth phase, a calibration function can also be applied in order to take into account the absolute error and to substrate it from the computed values. The function resulting from these fourth phase is the probability distribution function (W).

Figure 6:
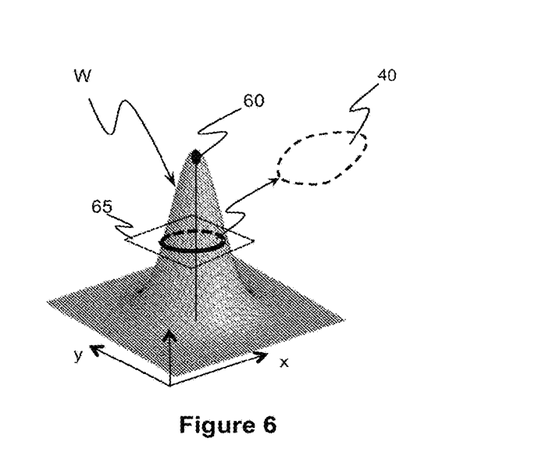
FIG. 6 illustrates a simplified example of function of the probability distribution function of presence of a marine mammal obtained according to a particular embodiment of the invention.

It should be note that the probability distribution function (W) shown in FIG. 6 is not representative of the results obtained and illustrated in FIGS. 4a and 4b. It serves as an simplified example of what can be built in step 24.

The next steps 25a to 25e consists in extracting from the probability distribution function (W) computed in step 24 information on the localization of the marine mammal 30, which can help the operator to decide if there is a need to implement or not mitigation procedures, such as the shutdown of the seismic sources of the PAM system. These information are:

(a) a value of localization of the marine mammal 30;

(b) a zone of uncertainty of localization of the marine mammal 30;

(c) a piece of information on the probability of presence of the marine mammal 30 inside the safety exclusion zone;

(d) a piece of information on the probability of presence of the marine mammal 30 outside the safety exclusion zone;

(e) a piece of information on the probability of presence of the marine mammal 30 in the intersection of the zone of uncertainty of localization and the safety exclusion zone.

In step 25a, the device determines a value of localization of the marine mammal 30 as a function of the probability distribution function (W). To do this, the device defines the value of localization as the maximum or the barycentre (referenced as 60 in FIG. 6) of the probability distribution function. One skilled in the art would understand there are plenty of methodologies to compute such function.

In step 25b, the device determines a zone of uncertainty of localization of the marine mammal 30 by setting a predetermined threshold 65 to the probability distribution function (W). The predetermined threshold 65 corresponds to the level of probability of presence of the marine animal that the operator wants to allocate to the zone of uncertainty of localization. For example, if it is decided that the method provides a zone of uncertainty of localization in which the marine animal has a probability of presence of 95%, the predetermined threshold 65 is set such that the volume above the threshold represents 95% (predetermined fraction) of the total volume of the probability distribution function (W). As illustrated on FIG. 6, the threshold 65 intersects the probability distribution function and generates a 2-dimensional surface that corresponds to the zone 40 of uncertainty of localization of the marine mammal 30 (also illustrated on FIG. 3).

Thus, the method according to the invention enables the operator to have a piece of information on the uncertainty of that localization further a value of localization of the marine animal.

When the zone of uncertainty of localization is determined, the device further compares the zone of uncertainty of localization with a predefined safety exclusion zone (for example an regulated exclusion zone imposed by a regulating agency).

In step 25c, the device provides a value representative of the probability of presence of the marine animal 30 inside the predefined safety exclusion zone 50 as a function of the result of the comparing step. In particular, this value is set as the volume of the density probability function inside the exclusion zone divided by the total volume of the density probability function.

In step 25d, the device provides a value representative of the probability of presence of the marine animal 30 outside the predefined safety exclusion zone 50 as a function of the result of the comparing step. In particular, this value is set as the volume of the density probability function outside the exclusion zone divided by the total volume of the density probability function.

In step 25e, the device provides a value representative of the probability of presence of the marine mammal 30 in the intersection of the zone 60 of uncertainty of localization and the safety exclusion zone 50. This value is set as the volume of the density probability function corresponding to said intersection divided by the total volume of the density probability function. To that end, the device determines if the zone 60 of uncertainty of localization overlaps, at least partially, the safety exclusion zone 50.

The device estimates that more the zone of uncertainty of localization overlaps the predefined safety exclusion zone, higher is the risk that the marine mammal 30 is located inside the safety exclusion zone 50 and provides information in that way.

The particular embodiment described here takes into account a set of data measured by the system PAM comprising TDOA data, AoA data, data of position of the acoustic sensors and data of underwater acoustic sound celerity. In an alternative embodiment (what we could call degraded mode operation), one can envisage that the localizing method takes into account a set of measured data and predefined data, e.g. TDOA and AoA data derived from measurements performed by the acoustic sensors and predetermined data on the position of sensors and/or on the acoustic sound celerity (by making some assumptions). The fact of fixing certain input parameters enables to avoid implementing communications with measuring units such as the navigation software or velocimeters for example, and thus to simplify the use in real time.

The information about the uncertainty of localization can be used to optimize the localization process. Indeed, several uncertainties of localization can be computed with different input parameters (measured data). It is then possible to cancel the use of spurious TDOA or AoA data, for example, which increase the localization uncertainty. Otherwise, the weighting of the input parameters can be adapted over time as a function of the localization uncertainty.

In a particular embodiment, method takes into account not only a set of data measured by the system PAM (what we call first PAM system), but also a set of data measured and collected by one or several additional PAM systems (what we call second PAM systems), which are distinct from the first PAM system. For that end, compared to the method described here-above, the localizing device further obtains a second set of measured data of said acoustic signal emitted by the marine animal from a network of acoustic sensors belonging to a second PAM system for example. Then it performs the steps 22 and 23 as a function of the second set of measured data in addition to the first set of measured data from the first PAM system itself. The resulting effect is to provide information about localization even more accurate (because of the greater number of data taken into account in the process). Thus the method can also apply to a multi-PAM system. To that end, the second passive acoustic monitoring system cooperates with the first passive acoustic monitoring system (which implements the localizing method) by means of radiocommunication means, such as radio frequency links, satellite links, etc.

The localization performances depend on the sensors locations. The person skilled understands that the larger the sensor network, the less an error on a sensor location, TDOA data or AoA data has an impact on the marine animal localization. The arrangement, as well as the number of sensors in the network, contributes to have homogeneous localization performances wherever is the marine animal. We can assimilate the arrangement of sensors to an antennae network. Then, the positioning performances can be assimilated to the antennae beam pattern. The beam pattern of conventional dedicated PAM line is directive whereas the beam pattern of 2D antennae is more omni-directionnal.

Although the embodiment described above relates to a two-dimensional (2D) network of acoustic sensors that allows a 2D computation, the person skilled will recognize that changes be made so as to implement three-dimensional (3D) network of acoustic sensors that allows a 3D computation: a Cartesian coordinate system can be used for example where the in-line direction (i.e. the direction in the horizontal plane parallel to the streamers) is referred to as the x-direction, the cross-line direction (i.e. the direction in the horizontal plane perpendicular to the streamers) is referred to as the y-direction, and the vertical direction (i.e. the direction perpendicular to the horizontal plane) is referred to as the z-direction. The third dimension enables to have more accurate data on the localization of the marine animal. The person skilled is able to adapt the configuration of sensor network (number and arrangement of acoustic sensors in space) as a function of the desirable beam pattern and the desirable degree of precision of localization data. For example, at least one sensor placed in front of the vessel allows to provide an piece of information on the presence of a marine animal in front of the vessel, contrary to the conventional dedicated PAM line, which is towed behind the vessel in the vessel's direction and has a hole in the directivity diagram is in the front of the vessel and thereby a high degree of localization error there. Indeed the uncertainty depends on the number of acoustic sensors which have detected a marine animal vocalization.

FIG. 7 shows the simplified structure of a localizing device (or a machine) according to a particular embodiment of the invention, which carries out the method shown in FIG.

5 for example. This device is comprised for example in the seismic vessel (e.g. in the passive acoustic monitoring system PAM).

The device 70 comprises a non-volatile memory 71 (e.g. a read-only memory (ROM) or a hard disk), a volatile memory 73 (e.g. a random access memory or RAM) and a processor 72. The non-volatile memory 71 is a non-transitory computer-readable carrier medium. It stores executable program code instructions, which are executed by the processor 72 in order to enable implementation of the localizing method described above in relation with FIG. 1.

Upon initialization, the aforementioned program code instructions are transferred from the non-volatile memory 71 to the volatile memory 73 so as to be executed by the processor 72. The volatile memory 43 likewise includes registers for storing the variables and parameters required for this execution.

The device 70 receives as inputs the measured data, i.e. the TDOA data 74a, the AoA data 74b, the positions of the acoustic sensors 74c and the underwater acoustic sound celerity 74d. It generates as outputs information about marine mammal localization, e.g. the localization of the marine mammal 75a, a piece of information on the uncertainty of localization of the marine mammal 75b, a piece of information on the probability of presence of the marine mammal inside the safety exclusion zone 75c, a piece of information on the probability of presence of the marine mammal outside the safety exclusion zone 75d, a piece of information on the probability of presence of the marine mammal in the intersection of the zone of uncertainty of localization and the safety exclusion zone 75e, as described above.

All the steps of the above steering method can be implemented equally well:
- by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a floppy disk, a CD-ROM or a DVD-ROM) or non-detachable; or
- by a dedicated machine or component, such as an FPGA (Field Programmable Gate Array), an ASIC (Application-Specific Integrated Circuit) or any dedicated hardware component.

In other words, the invention is not limited to a purely software-based implementation, in the form of computer program instructions, but that it can also be implemented in hardware form or any form combining a hardware portion and a software portion.

One may envisage that the localizing device, comprised in the PAM system, cooperates with the navigation software unit or the positioning streamer software unit. For example, the localizing device is comprised in the navigation software unit or the positioning streamer software unit so that the information about localization of the marine animal can be issued directly from the navigation software unit (e.g. on the navigation display) or the positioning streamer software unit.

At least one embodiment of the invention provides a technique for localizing a marine animal, enabling to provide accurate information about the marine animal localization.

At least one embodiment of the invention provides a technique for localizing a marine animal, providing information about the accuracy of the marine animal localization.

At least one embodiment of the invention provides a technique for localizing a marine animal, enabling to provide information on the uncertainty of localization of the marine animal.

It is also an aim of at least one embodiment of the invention to provide a technique for localizing a marine animal, enabling to provide an accurate value of localization of the marine animal.

At least one embodiment of the invention provides a technique for localizing a marine animal, enabling to provide information on the probability of presence of the marine animal inside a safety exclusion zone.

At least one embodiment of the invention provides a technique for localizing a marine animal, enabling to provide information on the probability of presence of the marine animal outside a safety exclusion zone.

At least one embodiment of the invention provides a technique for localizing a marine animal, enabling to provide information on the probability of presence of the marine animal in an intersection of a safety exclusion zone and a zone of uncertainty of localization of the marine animal.

At least one embodiment of the invention provides a technique for localizing a marine animal, enabling real time running in a passive acoustic monitoring system.

Although the present disclosure has been described with reference to one or more examples, workers skilled in the art will recognize that changes may be made in form and detail without departing from the scope of the disclosure and/or the appended claims.

The invention claimed is:

1. A method for localizing a marine animal in an underwater environment implemented by a first passive acoustic monitoring system, the first passive acoustic monitoring system comprising a network of acoustic sensors adapted to carry out measurements of acoustic signals, wherein the method comprises: obtaining, from the network of acoustic sensors, a first set of measured data of an acoustic signal emitted by a marine animal; defining a space of dimensional representation of the underwater environment discretized in a plurality of predefined cells, for each cell of a predefined set of cells among said plurality, obtaining an error corresponding to a deviation between: at least some of said measured data of the first set and corresponding theoretical data obtained by assuming that the marine animal is located in said cell, wherein the method comprises determining a value of localization of the marine animal as a function of said errors, wherein the method further comprises the steps of: determining among said predefined set of cells, a subset of cells corresponding to a zone of uncertainty of localization of the marine animal, said subset of cells being determined in function of the errors associated to the cells, comparing the subset of cells corresponding to the zone of uncertainty of localization with a subset of cells corresponding to a predefined safety exclusion zone.

2. The method according to claim 1, wherein the method comprises providing a piece of information on probability of presence of the marine animal inside the predefined safety exclusion zone, as a function of the result of the comparing step.

3. The method according to claim 1, wherein the method comprises providing a piece of information on probability of presence of the marine animal outside the predefined safety exclusion zone, as a function of the result of the comparing step.

4. The method according to claim 1, wherein said comparing step comprises detecting an intersection zone of the zone of uncertainty of localization and the predefined safety exclusion zone.

5. The method according to claim 1, wherein the method comprises establishing an error map from said errors obtained for the predefined set of cells.

6. The method according to claim 5, wherein the method comprises visually providing said error map.

7. The method according to claim 1, wherein each of said error is defined as a value of a cost function for said cell that gives said deviation.

8. The method according to claim 1, wherein the method comprises computing, from said errors, a probability distribution function of presence of the marine animal.

9. The method according to claim 8, wherein the method comprises determining said value of localization of the marine animal as a function of the probability distribution function.

10. The method according to claim 1, wherein the determining of said zone of uncertainty of localization of the marine animal comprises a step of applying a function of offset subtraction to said errors.

11. The method according to claim 1, wherein the determining of said zone of uncertainty of localization of the marine animal comprises a step of applying a function of inversion to said errors.

12. The method according to claim 1, wherein the determining of said zone of uncertainty of localization of the marine animal comprises a step of applying a function of normalization to said errors.

13. The method according to claim 1, wherein the determining of said zone of uncertainty of localization of the marine animal comprises a step of applying a function of calibration to said errors.

14. The method according to claim 8, wherein the method comprises determining said zone of uncertainty of localization of the marine animal as a function of the probability distribution function.

15. The method according to claim 1, wherein the measured data belong to the group consisting of: time difference of arrival data; angle of arrival data; data relative to location of the acoustic sensors; data relative to underwater acoustic sound celerity.

16. The method according to claim 1, wherein the method further comprises obtaining at least one second set of measured data of said acoustic signal emitted by the marine animal, collected from a network of acoustic sensors of at least one second passive acoustic monitoring system cooperating with said first passive acoustic monitoring system, and wherein said defining and obtaining steps are carried out as a function of said first and second sets of measured data.

17. A non-transitory computer-readable carrier medium storing a computer program product that comprises program code instructions for implementing a method according to claim 1.

18. A device for localizing a marine animal in an underwater environment, comprised in a passive acoustic monitoring system, the passive acoustic monitoring system comprising a network of acoustic sensors adapted to carry out measurements of acoustic signals, wherein the device comprises: means for obtaining, from the network of acoustic sensors, measured data of an acoustic signal emitted by a marine animal; means for defining a space of dimensional representation of the underwater environment discretized in a plurality of predefined cells; means for obtaining for each cell of a predefined set of cells among said plurality an error corresponding to a deviation between: at least some of said measured data of the first set and corresponding theoretical data obtained by assuming that the marine animal is located in said cell, means for determining a value of localization of the marine animal as a function of said errors, means for determining among said predefined set of cells, a subset of cells corresponding to a zone of uncertainty of localization of the marine animal, said subset of cells being determined in function of the errors associated to the cells, means for comparing the subset of cells corresponding to the zone of uncertainty of localization with a subset of cells corresponding to a predefined safety exclusion zone.

19. The device according to claim 18, wherein the passive acoustic monitoring system is configured to cooperate either with a navigation software unit or with a positioning streamer software unit.

* * * * *